United States Patent
Ayolasomyajula et al.

(10) Patent No.: US 10,817,397 B2
(45) Date of Patent: Oct. 27, 2020

(54) DYNAMIC DEVICE DETECTION AND ENHANCED DEVICE MANAGEMENT

(71) Applicant: Dell Products, L.P., Round Rock, TX (US)

(72) Inventors: Rakesh Kumar Ayolasomyajula, Georgetown, TX (US); Sudhir Vittal Shetty, Cedar Park, TX (US); Pushkala Iyer, Round Rock, TX (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 16/353,646

(22) Filed: Mar. 14, 2019

(65) Prior Publication Data

US 2020/0293420 A1 Sep. 17, 2020

(51) Int. Cl.
*G06F 11/30* (2006.01)
*G06F 13/38* (2006.01)
*H04L 12/24* (2006.01)

(52) U.S. Cl.
CPC ...... *G06F 11/3051* (2013.01); *G06F 11/3055* (2013.01); *H04L 41/0853* (2013.01)

(58) Field of Classification Search
None
See application file for complete search history.

(56) References Cited

U.S. PATENT DOCUMENTS

| | | | | |
|---|---|---|---|---|
| 2010/0061268 A1* | 3/2010 | Nishio | ..................... | G06F 3/122 370/254 |
| 2011/0242583 A1* | 10/2011 | Ray | ......................... | G06F 3/121 358/1.15 |
| 2017/0250879 A1* | 8/2017 | Chadha | ............. | G06F 16/24569 |
| 2019/0349281 A1* | 11/2019 | Oztaskent | ............... | H04L 41/12 |

* cited by examiner

*Primary Examiner* — Scott C Sun
(74) *Attorney, Agent, or Firm* — Fogarty LLP (57) ABSTRACT

Embodiments provide for supporting management of an unrecognized device operating as a component of an IHS (Information Handling System). An unrecognized device operating on the IHS is detected. The unrecognized device is probes for determining properties of the unrecognized device. The unrecognized device is monitored for characteristic communications that are indicative of a type of device. A signature of the unrecognized device is generated based on the probed properties and the monitored communications of the unrecognized. Based on the generated signature, a device pack is created that supports management of the unrecognized device. A device pack may include instructions used by a remote access controller of the IHS for management of the unrecognized device. The created device pack may be generated based on monitoring keys supported by firmware of the unrecognized device. The remote access controller may probe and monitor the unrecognized device.

20 Claims, 3 Drawing Sheets

DYNAMIC DEVICE DETECTION AND ENHANCED DEVICE MANAGEMENT

FIELD

This disclosure relates generally to Information Handling Systems (IHSs), and more specifically, to management of hardware components of an IHS.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

Groups of IHSs may be utilized within data center environments. A data center may include a large number of IHSs, such as enterprise blade servers that may be stacked and installed within racks. A data center may include large numbers of such server racks that may be organized into rows. Some administration of such data center IHSs may be done locally, but a significant amount of the administration of data center IHSs may be conducted via operations by remote administrators. In certain instances, remote administration of such managed IHSs allows management of some, or all, of the hardware and software components of the managed IHS. Remote management of a hardware device operating on a managed IHS may include providing capabilities for manual and automated configuration of the device and capabilities for monitoring the operations of the device.

SUMMARY

In various embodiments, a method is provided for supporting management of an unrecognized device operating as a component of an IHS (Information Handling System). The method includes detecting the unrecognized device operating on the IHS; probing the unrecognized device for properties of the unrecognized device; monitoring the unrecognized device for characteristic communications; generating a signature of the unrecognized device based on the probed properties and the monitored communications; and creating, based on the generated signature, a device pack supporting management of the unrecognized device.

In various method embodiments, the device pack comprises instructions used by a remote access controller of the IHS for management of the unrecognized device. In various method embodiments, the probing and the monitoring of the unrecognized device are performed by operations of the remote access controller. In various method embodiments, the created device pack is generated by modifying an existing device pack from a device pack repository. In various method embodiments, the created device pack is generated based on monitoring keys supported by firmware of the unrecognized device. In various method embodiments, the monitoring keys are detected based on the probing of the unrecognized device. In various method embodiments, the created device pack is added to the device pack repository.

In various additional embodiments, a system is provided for supporting management of an unrecognized device operating as a component of an IHS of a plurality of IHSs. The system includes: the IHS, wherein the IHS comprises a remote access controller configured to: detect the unrecognized device operating on the IHS; probe the unrecognized device for properties of the unrecognized device; and monitor the unrecognized device for characteristic communications; and transmit the probed properties and the monitored communications to a device management service. The system includes the device management service configured to: generate a signature of the unrecognized device based on the probed properties and the monitored communications; and create, based on the generated signature, a device pack supporting management of the unrecognized device.

In various system embodiments, the device pack comprises instructions used by the remote access controller of the IHS for management of the unrecognized device. In various system embodiments, the created device pack is generated by modifying an existing device pack from a device pack repository. In various system embodiments, the created device pack is generated based on monitoring keys supported by firmware of the unrecognized device. In various system embodiments, the monitoring keys are detected based on the probing of the unrecognized device. In various system embodiments, the device management service is further configured to add the created device pack to the device pack repository. In various system embodiments, the device management service is further configured to determine whether the created device pack is operable.

In various additional embodiments, an IHS operating within a network of IHSs. The IHS comprises: one or more processors operable to execute instructions for running software applications that support an unrecognized device as an operable component of the IHS; the unrecognized device; a remote access controller configured to communicate with a remote device management service in remote management of devices operating on the IHS, wherein the remote access controller is configured to: detect the unrecognized device operating on the IHS; probe the unrecognized device for properties of the unrecognized device; monitor the unrecognized device for characteristic communications; and transmit the probed properties and the monitored communications to a device management service, wherein the device management service generates a signature of the unrecognized device based on the probed properties and the monitored communications and creates, based on the generated signature, a device pack supporting management of the unrecognized device.

In various IHS embodiments, the device pack comprises instructions used by the remote access controller of the IHS for management of the unrecognized device. In various IHS embodiments, the created device pack is generated by modifying an existing device pack from a device pack repository. In various IHS embodiments, the created device pack is generated based on monitoring keys supported by firmware of the unrecognized device. In various IHS embodiments, the monitoring keys are detected based on the probing of the unrecognized device. In various IHS embodiments, the device management service is further configured to add the created device pack to the device pack repository.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources, such as a Central Processing Unit (CPU) or hardware or software control logic, Read-Only Memory (ROM), and/or other types of nonvolatile memory.

Figure 1:
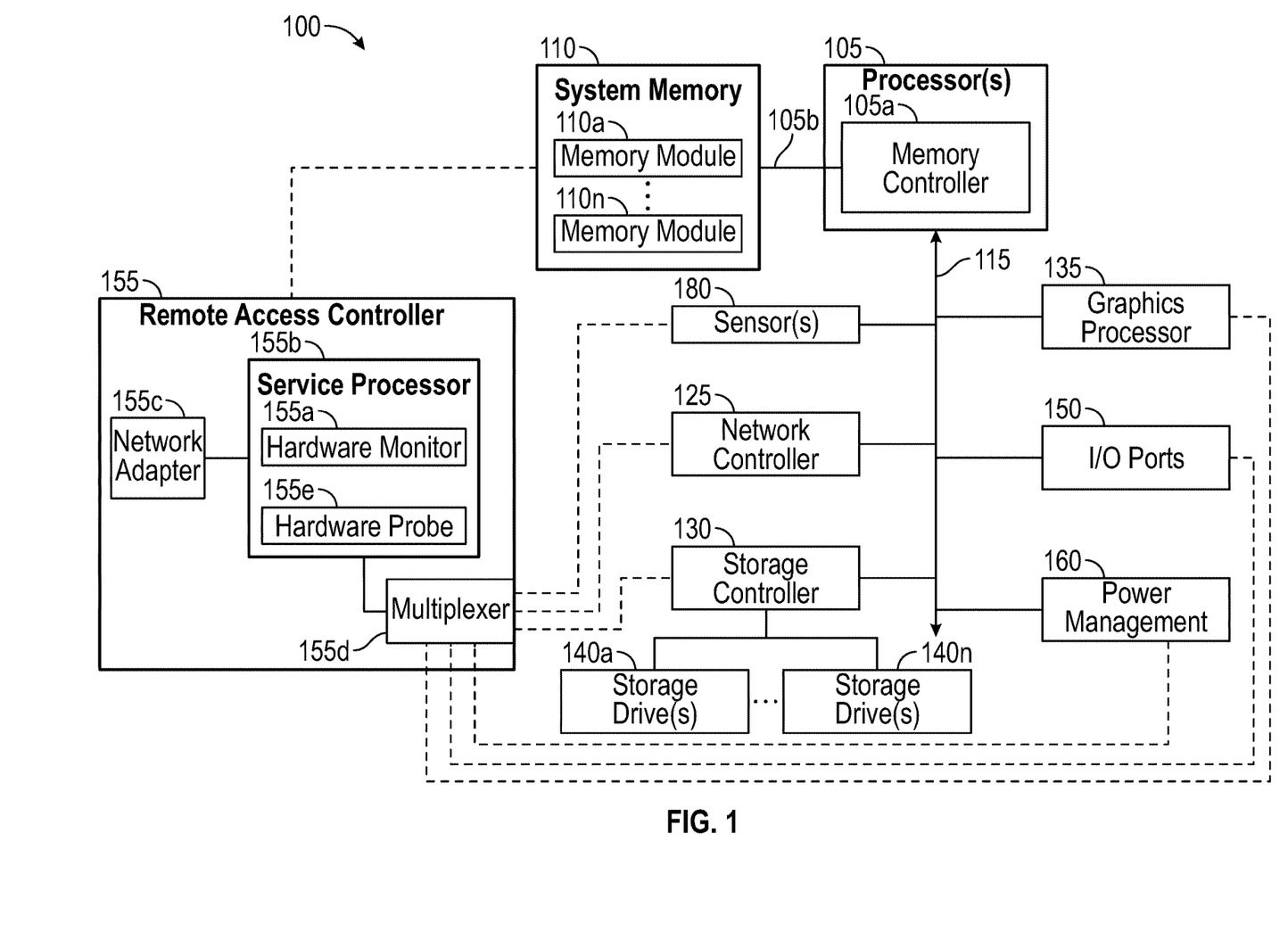
FIG. 1 is a block diagram depicting certain components of an IHS configured according to various embodiments for detection and management of unrecognized hardware components of the IHS.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below. FIG. 1 shows an example of an IHS configured to implement the systems and methods described herein according to certain embodiments. It should be appreciated that although certain IHS embodiments described herein may be discussed in the context of an enterprise computing device, other embodiments may be utilized.

As described, IHSs may be formed into large networks of managed IHSs within a data center. Effectively managing such large groups of IHSs may be accomplished using tools that allow administrators to remotely manage the IHSs individually and as members of groups of similarly configured IHSs. Remote management tools according to embodiments provide such capabilities in which managed IHSs include a remote access system that operates external to the operating system of the managed IHS. The remote access system of a managed IHS may interface, directly or indirectly, with devices operating as components of the managed IHS, where these devices may be temporarily or permanently coupled to the managed IHS. In order to manage a device operating on a managed IHS, the remote access controller may utilize a set of instructions for remotely administering the device and monitoring the operations of the managed device. In certain embodiments, such sets of instructions that allow management of a device may be referred to as a device pack.

A data center may employ policies regarding the use of unrecognized hardware components that are not supported by remote management systems. However, such unrecognized devices may nonetheless be installed in managed IHSs by administrators, in some cases inadvertently and in some cases in order to implement necessary repairs. Accordingly, devices that are unrecognized by the remote management system are commonly installed within data center environments. In some scenarios, devices that are unrecognized to the remote management system may be partially or fully operational components of a managed IHS. Lack of a device pack supporting remote management of the unrecognized device prevents the remote management system from managing the unrecognized device and thus also from effectively enforcing security protocols and operational controls on the unrecognized device.

FIG. 1 is a block diagram illustrating certain components of an IHS 100 configured according to certain embodiments to implement systems and methods described herein, in particular for detection and management of unrecognized hardware components of the IHS. In certain data center embodiments, a rack-mounted chassis may include one or more bays that each receive an individual sled (that may be additionally or alternatively referred to as a tray, blade, and/or node), such as compute sleds that provides processing resources and storage sleds that provide storage resources. In certain embodiments, IHS 100 may be a compute sled installed within rack-mounted chassis that is housed within a data center. In embodiments where IHS 100 is a compute sled installed within a chassis that is stacked within a rack along with other chassis that also include various sleds, IHS 100 may utilize certain shared power, network and cooling resources provided by the chassis and/or rack. In certain embodiments, various aspects of such shared capabilities by IHS 100 may be configurable. Although the embodiment of FIG. 1 describes an IHS in the form of a compute sled or other computing component that may be deployed within a bay of a rack-mounted chassis, other embodiments may be implemented using other types of IHSs.

In certain embodiments, IHS 100 may utilize one or more processors 105. In some embodiments, processors 105 may include a main processor and a co-processor, each of which may include a plurality of processing cores that, in certain scenarios, may each be used to run an instance of a server process. In certain embodiments, one or all of processor(s) 105 may be graphics processing units (GPUs) in scenarios where IHS 100 has been configured to support functions such as multimedia services and graphics applications. As illustrated, processor(s) 105 includes an integrated memory controller 105*a* that may be implemented directly within the circuitry of the processor 105, or the memory controller 105*a* may be a separate integrated circuit that is located on the same die as the processor 105.

The memory controller 105*a* may be configured to manage the transfer of data to and from the system memory 110 of the IHS 100 via a high-speed memory interface 105*b*. The system memory 110 may be coupled to processor(s) 105 via a memory bus 105*b* that provides the processor(s) 105 with high-speed memory used in the execution of computer program instructions by the processor(s) 105. Accordingly, system memory 110 may include memory components, such as such as static RAM (SRAM), dynamic RAM (DRAM), NAND Flash memory, suitable for supporting high-speed memory operations by the processor(s) 105. In certain embodiments, system memory 110 may combine both persistent, non-volatile memory and volatile memory.

In certain embodiments, the system memory 110 may be comprised of multiple removable memory modules. The system memory 110 of the illustrated embodiment includes removable memory modules 110a-n. Each of the removable memory modules 110a-n may correspond to a printed circuit board memory socket that receives a removable memory module 110a-n, such as a DIMM (Dual In-line Memory Module), that can be coupled to the socket and then decoupled from the socket as needed, such as to upgrade memory capabilities or to replace faulty components. Other embodiments of IHS system memory 110 may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory.

As described, administrators may replace various components of an IHS 100, such as one or more of the removable memory modules 110a-n. As illustrated, a remote access controller 155 of IHS 100 may be coupled to system memory 110 via a sideband connection by which certain operations of the memory modules 110a-n of the system memory 110 may be remotely managed. In certain scenarios, administrators may install memory modules 110a-n that are at least partially supported by system memory 110 but that are not supported by a remote management system implemented using remote access controller 155. As described in additional detail with regard to FIGS. 2 and 3, a remote management system may collect information characterizing an unrecognized memory module and may utilize the collected information to generate device pack instructions that will enable the remote access controller 155 to support remote management of the unrecognized memory module.

IHS 100 may utilize a chipset that may be implemented by integrated circuits that are connected to each processor 105. All or portions of the chipset may be implemented directly within the integrated circuitry of an individual processor 105. The chipset may provide the processor(s) 105 with access to a variety of resources accessible via one or more buses 115. Various embodiments may utilize any number of buses to provide the illustrated pathways served by bus 115. In certain embodiments, bus 115 may include a PCIe (PCI Express) switch fabric that is accessed via a PCIe root complex. In various embodiments, the resources available via buses 115 may include various hardware components, such as those illustrated in FIG. 1, that support remote management. As illustrated, certain of the managed hardware devices of IHS 100 may be accessible by a remote access controller 155 via sideband signaling pathways that operate independent of the operating system of IHS 100. In certain embodiments, the managed components may be additionally or alternatively accessed by the remote access controller 155 via the operating system of the IHS 100.

IHS 100 may also include one or more I/O ports 150, such as PCIe ports, that may be used to couple the IHS 100 directly to other IHSs, storage resources or other peripheral components. The I/O ports 150 may support temporary and permanent couplings of hardware devices to IHS 100. Any of the components coupled to I/O ports 150 may be managed remotely by operations of the remote access controller 155. Accordingly, any number of unrecognized components may be coupled to IHS 100 via I/O ports 150. As described above with regard to the installation of unrecognized memory modules in IHS 100, the remote management system of IHS 100 may collect information characterizing an unrecognized device coupled to an I/O port 150 of IHS 100 and may create a device pack that allows at least some remote management of the unrecognized device.

Another resource of IHS 100 that may be accessed by processor(s) 105 is a network controller 125, such as provided by a Network Interface Controller (NIC) that is coupled to the IHS 100 and that allows the IHS 100 to communicate via an external network, such as the Internet or a LAN. In certain scenarios, the network controller 125 of IHS 100 may be replaced with a network controller that is unrecognized to the remote management system. Processor(s) 105 may also be coupled to a power management unit 160 that may interface with a power system of a chassis in which an IHS 100 may be installed as a compute sled. As power capabilities of such power systems change, the power management unit 160 may be replaced with a component that is unrecognized to the remote management system.

In certain embodiments, a graphics processor 135 may be comprised within one or more video or graphics cards, or an embedded controller, installed as components of the IHS 100. In certain embodiments, graphics processor 135 may be an integrated in the remote access controller 155 and may be utilized to support the display of diagnostic and administrative interfaces related to IHS 100, via display devices that are coupled, either directly or remotely, to remote access controller 155. In embodiments where graphics processor 135 is a replaceable component of IHS 100, graphics processor 135 may be replaced with a graphics processor that is unrecognized by the remote management system.

In certain embodiments, the remote access controller 155 and/or the operating system of IHS 100 may utilize information collected by various sensors 180 located within the IHS. For instance, temperature data collected by sensors 180 may be utilized by the remote access controller 155 in support of closed-loop airflow cooling of the IHS 100. Various other types of environmental sensors may be utilized by IHS 100. In certain embodiments, sensors 180 may be used to detect any attempts to access the internal hardware of IHS 100, thus detecting any unauthorized tampering with IHS 100. Any such sensors 180 may be upgraded and or replaced by administrators such that the replacement sensor may be unrecognized by the remote management system.

In certain embodiments, IHS 100 may operate using a BIOS (Basic Input/Output System) that may be stored in a non-volatile memory accessible by the processor(s) 105. The BIOS may provide an abstraction layer by which the operating system of the IHS 100 interfaces with the hardware components of the IHS. Upon powering or restarting IHS 100, processor(s) 105 may utilize BIOS instructions to initialize and test hardware components coupled to the IHS, including both components permanently installed as components of the motherboard of IHS 100 and removable components installed within various expansion slots supported by the IHS 100. The BIOS instructions may also load an operating system for use by the IHS 100. In certain embodiments, IHS 100 may utilize Unified Extensible Firmware Interface (UEFI) in addition to or instead of a BIOS. In certain embodiments, the functions provided by a BIOS may be implemented, in full or in part, by the remote access controller 155.

In certain embodiments, remote access controller 155 may operate from a different power plane from the processors 105 and other components of IHS 100, thus allowing the remote access controller 155 to operate, and management tasks to proceed, while the processing cores of IHS 100 are powered off. As described, various functions provided by the BIOS, including launching the operating system of the IHS 100, may be implemented by the remote access controller 155. In some embodiments, the remote access controller 155 may perform various functions to verify the integrity of the IHS 100 and its hardware components prior to initialization of the IHS 100 (i.e., in a bare-metal state). As described, in certain instances, devices unrecognized to the remote management system may be installed to IHS 100. Such devices may be allowed to remain as operational components of IHS 100 since the remote access controller 155 may be able to verity the integrity of the unrecognized device in a bare metal state, even if remote management of the unrecognized device is not supported.

As illustrated, remote access controller 155 may include a service processor 155a, or specialized microcontroller, that operates management software that supports remote monitoring and administration of IHS 100. Remote access controller 155 may be installed on the motherboard of IHS 100 or may be coupled to IHS 100 via an expansion slot provided by the motherboard. In support of remote monitoring functions, network adapter 125c may support connections with remote access controller 155 using wired and/or wireless network connections via a variety of network technologies. As a non-limiting example of a remote access controller, the integrated Dell Remote Access Controller (iDRAC) from Dell® is embedded within Dell PowerEdge™ servers and provides functionality used by information technology (IT) administrators to deploy, update, monitor, and maintain servers remotely.

In some embodiments, remote access controller 155 may support monitoring and administration of various managed devices 110, 125, 130, 135, 150, 160, 180 of an IHS via a sideband bus interface. For instance, messages utilized in detection, interrogation and management of unrecognized hardware components may be transmitted using 120 sideband bus connections that may be established with each of the respective managed devices 110, 125, 130, 135, 150, 160, 180 through the operation of a multiplexer 155d of the remote access controller 155. As illustrated, the managed devices 110, 125, 130, 135, 150, 160, 180 of IHS 100 may also be coupled to the IHS processor(s) 105 via an in-line bus 115, such as a PCIe root complex, that is separate from the sideband bus connections used for device management. In certain embodiments, the remote access controller 155 may establish such in-line bus 115 connections via the operating system of the IHS 100. In such embodiments, remote access controller 155 may query the operating system of IHS 100 via the processor 105 or chipset of the IHS.

As illustrated, in certain embodiments, the remote access controller 155 may include a secure storage that may be implemented via a memory device that is isolated from the operating system of IHS 100. The remote access controller 155 may utilize such secure storage in implementing procedures that collect information pertaining to an unrecognized hardware device operating on IHS 100. As illustrated, remote access controller 155 may include a hardware monitor 155a and a hardware probe 155e. As described in additional detail with regard to FIGS. 2 and 3, these capabilities of the remote access controller 155 may be utilized to collect information pertaining to devices operating in IHS 100 that are unrecognized by the remote access controller 155, and thus to the remote monitoring system.

In detecting an unrecognized device operating on IHS 100, remote access controller 155 may detect communications from unrecognized devices on sideband management buses. Once an unrecognized device has been detected, the hardware monitor 155a and hardware probe 155e may use such sideband signaling pathways to collect information describing the unrecognized device and also describing the operation of the unrecognized device. Additionally or alternatively, the remote access controller 155 may receive notification of a new device from the operation system of IHS 100. Upon determining the new device is an unrecognized device, the remote access controller 155 may collect information describing the unrecognized device via queries supported by the operating system of IHS 100.

Figure 2:
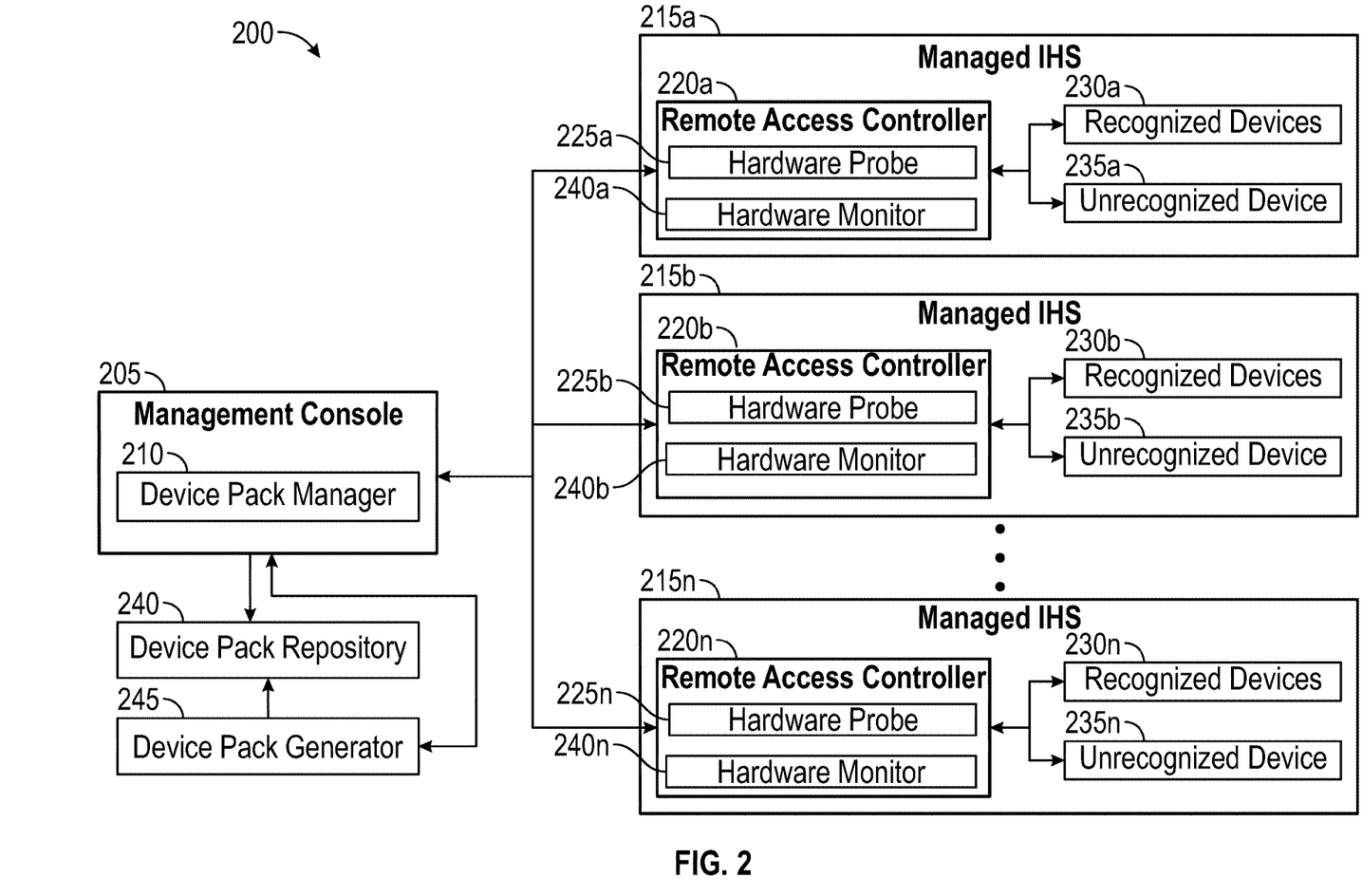
FIG. 2 is a block diagram depicting certain components of a system configured according to various embodiments for detection and management of unrecognized hardware components of a plurality of managed IHSs.

As described in additional detail with regard to FIG. 2, The remote access controller 155 may interoperate with a remote management console that provides access to various system that implement remote management functions. The information collected by remote access controller 155 that characterizes an unrecognized device may be transmitted to the remote management console, or a device management application operating at the direction of the remote management console, in order to determine if a compatible device pack is available, or if a compatible device back can be generated. As described in additional detail with regard to FIG. 3, the remote management console may utilize a device pack management system that may create a device compatible that is compatible for use with an unrecognized device.

In various embodiments, an IHS 100 does not include each of the components shown in FIG. 1. In various embodiments, an IHS 100 may include various additional components in addition to those that are shown in FIG. 1. Furthermore, some components that are represented as separate components in FIG. 1 may in certain embodiments instead be integrated with other components. For example, in certain embodiments, all or a portion of the functionality provided by the illustrated components may instead be provided by components integrated into the one or more processor(s) 105 as a systems-on-a-chip.

FIG. 2 is a block diagram depicting certain components of a system 200 that may be configured for detection and management of unrecognized hardware components of a plurality of managed IHSs 215a-n. As described with regard to FIG. 1, a managed IHS, such a blade server utilized within a data center, may include a remote access controller 220a-n by which various aspects of managed IHSs 215a-n may be remotely monitored and administered. In certain embodiments, the remote access controllers 220a-n of managed IHS 215a-n may communicate with a device pack manger 210 process of a management console 205 in supporting the management of unrecognized devices 235a-n detected to be operating on managed IHSs 215a-n. As described, the operations of remote access controllers 220a-n may be external to the operating system of a managed IHS 215a-n, thus allowing unrecognized devices 235a-n to be detected and configured for managed operations without the operating system of IHS 215a-n.

As illustrated, each remote access controller 220a-n may include capabilities that operate as a hardware probe 225a-n and as a hardware monitor 240a-n. In certain embodiments, each remote access controller 220a-n may initiate the operation of the respective hardware probes 225a-n and the hardware monitors 240a-n upon the detection of an unrecognized device 235a-n operating as a component of a respective managed IHS 215a-n. In certain embodiments, a remote access controller 220a may receive a notification of an unrecognized device 235a that is an operable component of an IHS 215a. For instance, the operating system of managed IHS 215a may detect installation of a new device. In such scenarios, the operating system may fully support the new device, or may provide limited support for the new device. In either case, the new device is at least partially operable and is thus supported by some of the hardware and software components of IHS 215a. Although such new devices may be operable components of managed IHS 215a, remote management of the new device may nonetheless be unsupported. Accordingly, the new device is an unrecognized device 235a from the perspective of the remote device management system.

In certain embodiments, the unrecognized device 235a may be detected directly by the remote access controller 220a. As described with regard to FIG. 1, a remote access controller 220a may be coupled to various managed hardware components via sideband signaling pathways between the remote access controller and the managed devices. As described, the remote access controller 220a may support remote management of recognized devices 230a operating on managed IHS 215a. In certain embodiments, the remote access controller 220a may detect the coupling of an unrecognized device 235a to a sideband signaling pathways supported by the remote access controller 220a. In certain embodiments, the remote access controller 220a may detect messages on a sideband signaling bus from an unrecognized device 235a. As described in additional detail with regard to FIG. 3, the remote access controller 220a may rely on a remote device pack management system 210a in order to determine whether remote management of a new device is supported by an existing device pack, or by a device pack that can be modified such that it may support at least partial remote management of the unrecognized device.

If a new device is not supported by an existing device pack and is thus an unrecognized device 235a, the remote access controller 220a may initiate the operation of a hardware probe 225a and a hardware monitor 240a in collecting characteristic information pertaining to the unrecognized device 235a. In certain embodiments, the hardware probe 225a may utilize a library of queries that are supported by known types of devices. For example, the hardware probe 225a may issue queries determining whether the unrecognized device 235a includes any support for any of various MIB (Management Information Base) compliant device management protocols. If supported by an unrecognized device, such queries may be used by the hardware probe 225a to determine various properties of the unrecognized device.

In certain embodiments, the hardware probe 225a may direct initial queries based on the mechanism by which the unrecognized device 235a was detected. For instance, in scenarios where a new device is reported by a storage controller, such as storage controller 130 of FIG. 1, the hardware probe 225a may generate queries supported by storage interfaces. In such instances, the hardware probe 225a may issue queries determining whether the new storage device includes any support for management protocols that are used in the management of storage devices. In scenarios where a new device is detected by the operating system of managed IHS 215a, the operating system may provide the remote access controller 220a with information regarding the type of the new device, such as the detection of a new network controller, such as network controller 125 of FIG. 1. In another example, the remote access controller 220a may detect a new device coupled to a sideband management bus and, based on a classification of the bus, the hardware probe 240a may issue queries supported by devices of that classification. For instance, if the remote access controller 220a detects a new device on a sideband management bus classified for use by sensors, the hardware probe 225a may issue queries supported by protocols that are commonly utilized by sensors.

The queries issued by the hardware probe 225a may return various types of information describing the unrecognized device. For instance, if an unrecognized device supports MIB device management protocols, queries by hardware probe 225a may return properties of the unrecognized device such as the manufacturer of the device, the model number of the device, any unique identifier associated with the device, a public key associated with the device, a signature generated based on the firmware of the device and the firmware version in use by the device. If the hardware probe 225a determines a type for the unrecognized device, additional queries may be generated in order to determine additional properties of the unrecognized device. For instance, if the initial queries by the hardware probe 225a provide information indicating an unrecognized device is a storage device, the hardware probe 225a may query the unrecognized storage device for storage properties of the device, such as the storage capacity, storage speed, thermal characteristics and power consumption of the storage device, The remote access controller 220a may also utilize a hardware monitor 240a in collecting data for use in characterizing an unrecognized device 235a operating on IHS 100. In certain embodiments, the operations of the hardware monitor 240a may run after the operations of the hardware probe 225a, such that any determined properties of the unrecognized device 235a may be utilized to direct the monitoring operations of the hardware monitor 240a. In other embodiments, the operations of the hardware monitor 240a may run concurrently, or prior, to the operations of the hardware probe 225a.

In certain embodiments, hardware monitor 240a may monitor transactions by the unrecognized device. For instance, hardware monitor 240a may monitor the bus transactions by an unrecognized device on a sideband management bus, such as described with regard to FIG. 1. If the type of the unrecognized device has been determined, the hardware monitor 240a may monitor for communications to or from that type of device. For instance, if the unrecognized device is determined to be a sensor, the hardware monitor 240a may monitor for periodic thermal reports and fan requests issued by the sensor, where such communications are issued via a messaging protocol used by sensor in support of the airflow cooling system of the managed IHS 215a. Similarly, the hardware monitor 240a may detect communications by an unrecognized device coupled to an I/O port of the managed IHS 215a, where the communications are determined to be USB compliant. A specific storage protocol in use by an unrecognized storage device may be similarly determined by the hardware monitor 240a via monitoring for various types of storage protocol communications by the unrecognized storage device.

Upon collecting properties of the unrecognized device 235b by the hardware probe 225a and monitoring the communications by the unrecognized device 235b by the hardware monitor 240a, the collected information may be transmitted to a device pack management system 210 that operates at the direction of the remote management console 205. Upon receipt of such collected information regarding an unrecognized device, the device pack manager 210 may generate a signature combining the properties and monitored communications of the unrecognized device. The generated signature may characterize the unrecognized device 235*b* by specifying confirmed and inferred properties, including observed communication patterns, of the unrecognized device 235*b*.

Based on the generated signature, the device pack manager 210 may search a central device pack repository 240 for a device pack compatible with the unrecognized device 235*b*. If a compatible device pack is identified in the device pack repository 240, the unrecognized device 235*b* may be deemed a fully-supported unrecognized device 230*a*. If no compatible device pack is identified, the device pack manager 210 may identify the device pack from the repository 240 that is closest to being compatible with the unrecognized device 235*b*. In certain instances, the device pack manager 210 may modify this device pack that is closest to compatibility until the modified device pack supports remote management of the unrecognized device 235*b*. In certain embodiments, the device pack manager 210 may rely on a device pack generator 245 that may generate a new device pack for an unrecognized device 235*b* using an existing device pack from repository 240 as a template. In certain embodiments, the device pack generator 245 may alternatively or additionally generate a new device pack from scratch based on information collected by remote access controller 220*a*, where the collected information may be provided by the firmware of the unrecognized device 235*a* and the collected information specifies remote management operations that are supported by the unrecognized device 235*a*.

Figure 3:
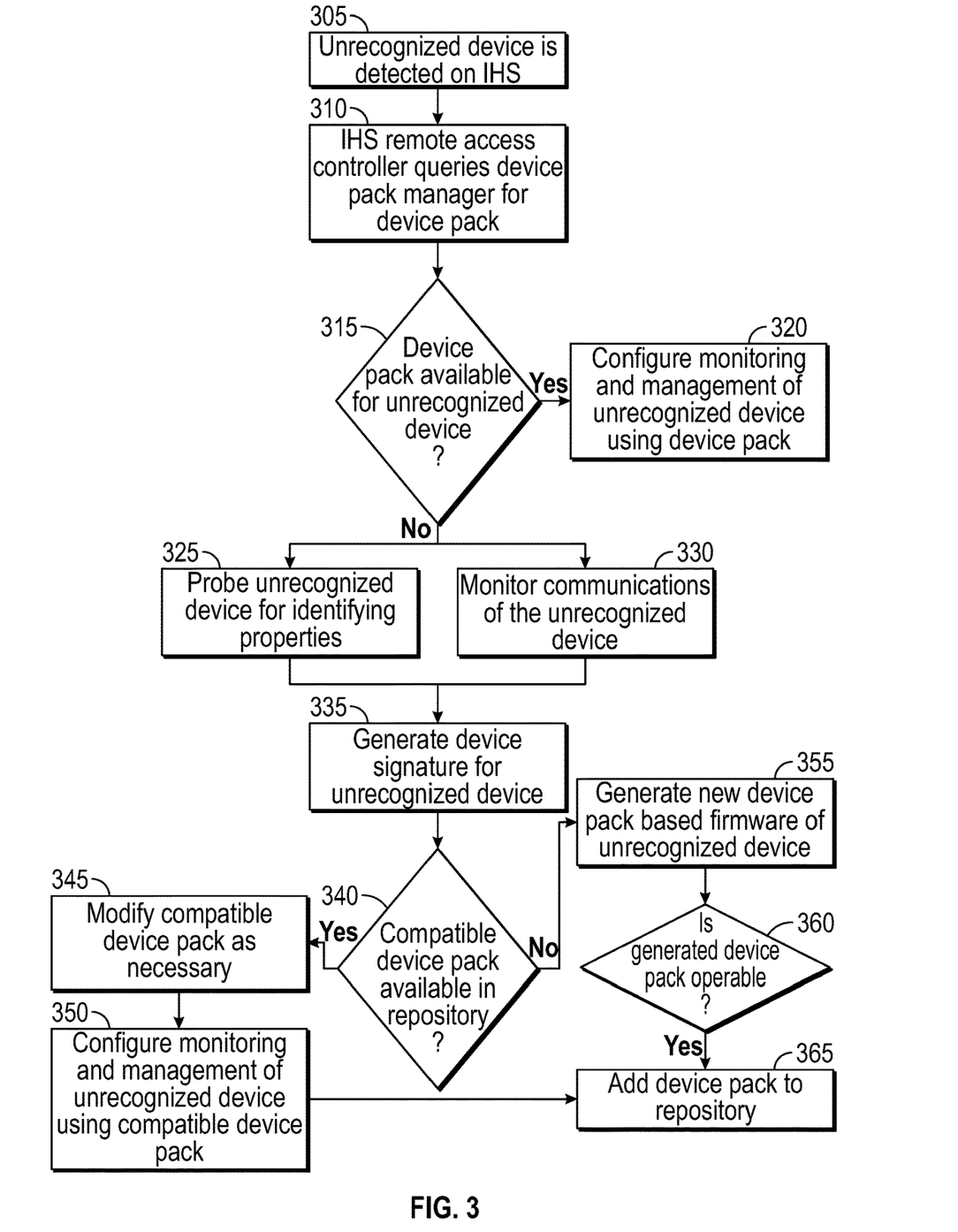
FIG. 3 is a flow chart illustrating certain steps of a process according to certain embodiments for detection and management of unrecognized hardware components of a managed IHS.

FIG. 3 illustrates certain steps of a process according to certain embodiments for detection and management of unrecognized hardware components of a managed IHS operating within a network of managed IHSs, such as within a data center. The illustrated embodiment begins at block 305 with the detection of an unrecognized device operating on a managed IHS, such as IHS 100 of FIG. 1 and managed IHSs 215*a*-*n* of FIG. 2. As described, a device may be installed in a managed IHS such that the device is operational, but the device is not supported by the remote access system used to manage the IHS. In certain embodiments, an unrecognized device may be detected directly by a remote access controller of the managed device. In other embodiments, notification of a new device may be provided to the remote access controller by the operating system of the managed IHS.

At block 310, the remote access controller issues a query to a device pack management system in order to determine whether the remote management system supports the new device. At block 315, the device pack manager determines whether a device pack supporting the new device is available, where device pack provides the instructions necessary for management of the device by the remote access controller of the managed IHS. If a device pack is located within a repository, the device pack manager may transmit the device pack to the remote access controller of the managed IHS. The device pack is then utilized by the remote access controller to configure remote management of the new device.

If the remote device pack manager does not find a device pack supporting the new device, the remote access controller may sequentially or serially proceed to blocks 325 and 330 for the collection of information characterizing the unrecognized device. As described with regard to FIGS. 1 and 2, the remote access controller of the managed IHS may implement procedures for probing the unrecognized device and thus identifying properties of the unrecognized device. At block 325, a hardware probe of the remote access controller may issue various queries to the unrecognized device, where the queries may conform to various communication protocols utilized by different types of supported devices. As described, the hardware probe may generate queries that seek to interrogate an unrecognized device in order to determine properties of the unrecognized device, such as the manufacturer of the unrecognized device, the model number of the unrecognized device and the version of the firmware in use by the unrecognized device.

At block 330, a hardware monitor of the remote access controller may monitor communications of the unrecognized device, including communications transmitted by the unrecognized device and communications received by the unrecognized device. For instance, the hardware monitor may detect the transmission of Intelligent Platform Management Interface (IPMI) messages by an unrecognized device. In such instances, the hardware monitor may also determine that the detected IPMI messages correspond to sensors providing environmental condition reports utilized by the cooling system of the managed IHS. In other scenarios, the hardware monitor may detect the transmission of storage protocol messages by an unrecognized device, thus indicating the new device is a storage controller or a storage device. In certain embodiments, the collected properties of the unrecognized device and the monitored communications of the unrecognized device may be transmitted to a remote device management tool. Using the provided properties and communications of the unrecognized device, at block 335, the remote device pack manager may generate a signature that characterizes the unrecognized device.

Based on the generated signature, at block 340, the remote device pack manager determines whether a compatible device pack is available within a device pack repository. In certain embodiments, compatible device packs may be device packs for devices that are closely related to the unrecognized device. For instance, a device pack may support remote management of devices of the same model and by the same manufacturer as the model and manufacturer of an unrecognized device. However, this device pack may not support the version of the firmware currently in use by the unrecognized device. In certain of such instances, the differences between the firmware versions do not impact the ability to support remote management of the unrecognized device.

In certain embodiments, at block 345, the device pack manager may utilize a closely-related device pack as a template for generating a new device pack for the unrecognized device. In such embodiments, the new device pack may suppress certain device properties from the related device pack. For instance, in scenarios where the firmware of the unrecognized device does not correspond to firmware supported by the remote management system, the new device pack may utilize the remote management instructions of the device pack used by the related device, but may omit any of these remote management instructions that are specific to any specific version of the firmware of the managed device. In this manner, a device pack may be generated that provides at least partial capabilities for remote management of an unrecognized device.

At block 350, the generated device pack may be transmitted from the remote device pack manager to the remote access controller of the managed IHS. Using the instructions of the generated device pack, the remote access controller may be configured to implement remote management of the unrecognized device. In certain embodiments, the device pack manager may test the management capabilities of the generated device pack by configuring the remote access controller at block 350 and proceeding to initiate test routines that determine whether a minimum set of functions are operable for remote management of the unrecognized device. If such tests indicate that the generated device pack allows remote management of an unrecognized device, at block 365, the generated device pack may be added to the device pack repository, thus providing a device pack that has been verified for use with managed devices of the same type of the unrecognized device.

In certain scenarios, at block 340, the remote device pack manager determines that no compatible device pack is available in the repository, even if an existing device pack is utilized as a template and modified to provide a compatible device pack for the unrecognized device. In certain embodiments, the determination may be made only after one or more existing device packs are modified and tested, where such tests would indicate that the modified device packs failed to enable remote management of the unrecognized device. In scenarios where no existing device pack can be modified, at block 355, the remote device pack manager generates a new device pack for the unrecognized device.

In certain embodiments, the remote device pack manager may generate a new device pack based on queries performed by the remote access controller of the managed IHS. In such embodiments, the remote access controller may be configured to query the firmware of the unrecognized device in order to determine whether the unrecognized device supports any remote monitoring keys that are recognized by the remote monitoring system. The monitoring keys supported by the firmware of the unrecognized device may be tokens or other codes recognized by the remote monitoring system as associated with a particular monitoring capability supported by the remote monitoring system. For instance, the remote monitoring system may advertise or otherwise make known a definition of monitoring capabilities supported by the system, where each supported capability may be associated with a monitoring key such as a unique token or other code.

In certain embodiments, a device installed within an IHS may be configured such that the firmware of a device supports queries that return one or more such monitoring keys that correspond to monitoring capabilities supported by the remote monitoring system. If a device is implemented to support such monitoring keys, such devices may be installed within a managed IHS and may provide a mechanism by which the remote access controller of the managed IHS may determine monitoring capabilities supported by the new device. Based on the supported monitoring keys reported by the firmware of the new device, the device pack manager may generate a new device pack for use by the remote access controller in support of remote management of the new component. This enables new devices to be utilized within a data center, while supporting remote monitoring of the new device without having to wait for a new device pack to be manually defined for the new device.

At block 360, the device pack manager may test the device pack generated based on the reported monitoring keys in order to determine whether the device pack is operational. For instance, the device pack manager may transmit the generated device pack to the remote access controller of the managed IHS in which the unrecognized device is operating. The remote access controller and the remote management console may conduct a series of tests in order to ascertain whether the remote monitoring capabilities specified by the detected monitoring keys are operational with respect to the new device. If the new generated device pack is operational, at block 365, the generated device pack may be added to the device pack repository, thus augmenting the ability of the device pack manager to support monitoring of similar unrecognized devices. In certain embodiments, if the device pack manager is unable to create a device pack that provides at least partial remote management of an unrecognized device operating on a managed IHS, the remote management console and the remote access controller of the managed IHS may designate the unrecognized device as a potential security threat, which may trigger auxiliary monitoring procedures by the remote access controller that operate to quarantine the unrecognized device and alert administrators if suspicious activity is detected by the unrecognized device.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method for supporting management of an unrecognized device operating as a component of an IHS (Information Handling System) that comprises a remote access controller comprising a network interface supporting remote management of the IHS and further comprising a plurality of sideband bus connections with devices that are components of the IHS, the method comprising:
    detecting the unrecognized device operating on the IHS, wherein the unrecognized device is detected by the remote access controller based on communications from the unrecognized device on a sideband bus connection;
    probing the unrecognized device by the remote access controller via the sideband bud connection for properties of the unrecognized device;
    monitoring the unrecognized device by the remote access controller via the sideband bud connection for characteristic communications;
    generating a signature of the unrecognized device based on the probed properties and the monitored communications; and
    creating, based on the generated signature, a device pack supporting management of the unrecognized device.

2. The method of claim 1, wherein the device pack comprises instructions used by a remote access controller of the IHS for management of the unrecognized device.

3. The method of claim 2, wherein the probing and the monitoring of the unrecognized device are performed by operations of the remote access controller.

4. The method of claim 1, wherein the created device pack is generated by modifying an existing device pack from a device pack repository.

5. The method of claim 1, wherein the created device pack is generated based on monitoring keys supported by firmware of the unrecognized device, wherein the keys correspond to remote monitoring capabilities.

6. The method of claim 5, wherein the monitoring keys are detected based on the probing of the unrecognized device.

7. The method of claim 4, wherein the created device pack is added to the device pack repository.

8. A system supporting management of an unrecognized device operating as a component of an IHS (Information Handling System), the system comprising:
    the IHS, wherein the IHS comprises a remote access controller comprising a network interface supporting remote management of the IHS and further comprising a plurality of sideband bus connections with devices that are components of the IHS, wherein the remote access controller is configured to:
        detect the unrecognized device operating on the IHS, wherein the unrecognized device is detected based on communications from the unrecognized device on a sideband bus connection;
        probe the unrecognized device via the sideband bud connection for properties of the unrecognized device;
        monitor the unrecognized device via the sideband bud connection for characteristic communications; and
        transmit the probed properties and the monitored communications to a device management service;
    the device management service configured to:
        generate a signature of the unrecognized device based on the probed properties and the monitored communications; and
        create, based on the generated signature, a device pack supporting management of the unrecognized device by the remote access controller.

9. The system of claim 8, wherein the device pack comprises instructions used by the remote access controller of the IHS for remote management of the unrecognized device.

10. The system of claim 8, wherein the created device pack is generated by modifying an existing device pack from a device pack repository.

11. The system of claim 8, wherein the created device pack is generated based on monitoring keys supported by firmware of the unrecognized device, wherein the keys correspond to remote monitoring capabilities.

12. The system of claim 11, wherein the monitoring keys are detected based on the probing of the unrecognized device.

13. The system of claim 10, wherein the device management service is further configured to add the created device pack to the device pack repository.

14. The system of claim 8, wherein the device management service is further configured to determine whether the created device pack is operable.

15. An IHS (Information Handling System) operating within a network of IHSs, wherein the IHS comprises:
    one or more processors operable to execute instructions for running software applications that support an unrecognized device as an operable component of the IHS;
    the unrecognized device;
    a remote access controller configured to communicate with a remote device management service in remote management of devices operating on the IHS, wherein the remote access controller comprises a plurality of sideband bus connections with devices that are components of the IHS, wherein the remote access controller is configured to:
        detect the unrecognized device operating on the IHS, wherein the unrecognized device is detected based on communications from the unrecognized device on a sideband bus connection;
        probe the unrecognized device via the sideband bud connection for properties of the unrecognized device;
        monitor the unrecognized device via the sideband bud connection for characteristic communications; and
        transmit the probed properties and the monitored communications to a device management service, wherein the device management service generates a signature of the unrecognized device based on the probed properties and the monitored communications and creates, based on the generated signature, a device pack supporting management of the unrecognized device by the remote access controller.

16. The IHS of claim 15, wherein the device pack comprises instructions used by the remote access controller of the IHS for remote management of the unrecognized device.

17. The IHS of claim 15, wherein the created device pack is generated by modifying an existing device pack from a device pack repository.

18. The IHS of claim 15, wherein the created device pack is generated based on monitoring keys supported by firmware of the unrecognized device, wherein the keys correspond to remote monitoring capabilities.

19. The IHS of claim 18, wherein the monitoring keys are detected based on the probing of the unrecognized device.

20. The IHS of claim 15, wherein the device management service is further configured to add the created device pack to the device pack repository.

* * * * *